US012320137B2

(12) United States Patent
Velasco

(10) Patent No.: US 12,320,137 B2
(45) Date of Patent: Jun. 3, 2025

(54) HOLDING DEVICE FOR ARTICLES AND METHOD OF CONSTRUCTING A HOLDING DEVICE ASSEMBLY

(71) Applicant: Kirsten Ann Velasco, Schaumburg, IL (US)

(72) Inventor: Kirsten Ann Velasco, Schaumburg, IL (US)

(*) Notice: Subject to any disclaimer, the term of this patent is extended or adjusted under 35 U.S.C. 154(b) by 22 days.

(21) Appl. No.: 18/139,669

(22) Filed: Apr. 26, 2023

(65) Prior Publication Data

US 2024/0003158 A1 Jan. 4, 2024

Related U.S. Application Data

(60) Provisional application No. 63/357,243, filed on Jun. 30, 2022.

(51) Int. Cl.

| | |
|---|---|
| ***E04H 12/22*** | (2006.01) |
| ***A24F 13/08*** | (2006.01) |
| ***B43K 23/00*** | (2006.01) |
| ***B43M 99/00*** | (2010.01) |
| ***B44D 3/12*** | (2006.01) |

(52) U.S. Cl.

CPC ............. *E04H 12/22* (2013.01); *A24F 13/08* (2013.01); *B43K 23/001* (2013.01); *B43M 99/008* (2013.01); *B44D 3/123* (2013.01)

(58) Field of Classification Search

CPC ...... B65D 1/265; B65D 35/56; B65D 35/565; B65D 2571/00; B65D 7/14; E04H 12/22; A24F 13/08; B43K 23/001; B43M 99/008; B44D 3/123

See application file for complete search history.

(56) References Cited

U.S. PATENT DOCUMENTS

| | | | | |
|---|---|---|---|---|
| 994,913 A | | 6/1911 | Elliot | |
| 1,545,647 A | | 7/1925 | Fargo | |
| 1,569,279 A | | 1/1926 | Hoffman | |
| 1,870,924 A | | 8/1932 | Platzer | |
| 2,483,188 A | | 9/1949 | Elger | |
| 2,646,243 A | * | 7/1953 | Rycroft | A62C 13/78<br>248/314 |
| 2,827,879 A | * | 3/1958 | Rosa | B43M 99/003<br>211/69.7 |
| 3,286,695 A | * | 11/1966 | Martin | B43K 8/00<br>401/258 |

(Continued)

OTHER PUBLICATIONS

VFIRE Stand https://www.etsy.com/listing/1147524287/vfire-stand?gpla=1&gao=1&.

(Continued)

*Primary Examiner* — Kareen K Thomas

(74) *Attorney, Agent, or Firm* — Scherrer Patent & Trademark Law, P.C.; Stephen T. Scherrer; Monique A. Morneault

(57) ABSTRACT

The present disclosure relates to an improved holding device for receiving and holding a variety of articles upright or vertically. The present holding device includes a flexible chamber configured for receiving articles of various shapes and sizes and securing the articles in the upright position. The stabilizing base can be any shape or design, and accommodates various decorations, logos and brands for display. The present disclosure further relates to an improved holding device assembly.

13 Claims, 5 Drawing Sheets

(56) References Cited

U.S. PATENT DOCUMENTS

| | | | | |
|---|---|---|---|---|
| 3,388,249 | A * | 6/1968 | Orbach | F21V 29/83 362/345 |
| 4,016,982 | A | 4/1977 | Schreiber | |
| 4,494,660 | A | 1/1985 | Hansen | |
| 4,517,993 | A | 5/1985 | Tobias | |
| 5,308,179 | A * | 5/1994 | Whitright | B43K 5/005 401/209 |
| 5,444,889 | A | 8/1995 | Barre | |
| 6,200,052 | B1 | 3/2001 | Pitaniello | |
| D732,739 | S | 6/2015 | Mendoza et al. | |
| 9,950,556 | B1 | 4/2018 | Laemie | |
| 10,104,950 | B1 | 10/2018 | Provost et al. | |
| 2003/0146122 | A1 | 8/2003 | Westfield et al. | |
| 2004/0163979 | A1 | 8/2004 | Bender | |
| 2006/0226324 | A1 | 10/2006 | Pitaniello | |
| 2007/0195529 | A1 * | 8/2007 | Yu | B43K 25/00 362/253 |
| 2011/0027002 | A1 | 2/2011 | Castro et al. | |
| 2012/0195673 | A1 | 8/2012 | Brooks et al. | |
| 2014/0332642 | A1 | 11/2014 | Lim | |
| 2016/0262526 | A1 | 9/2016 | Gonzalez | |
| 2016/0297341 | A1 | 10/2016 | Wallace et al. | |
| 2018/0008036 | A1 | 1/2018 | Chih | |
| 2018/0220787 | A1 | 8/2018 | Pegues | |
| 2018/0303254 | A1 | 10/2018 | Pretotto | |
| 2019/0372368 | A1 | 12/2019 | Eckerson | |
| 2019/0384418 | A1 | 12/2019 | Kim | |
| 2020/0077700 | A1 | 3/2020 | Alarcon et al. | |
| 2020/0383376 | A1 | 12/2020 | Scherr | |

OTHER PUBLICATIONS

Vape Cartridge Holder organizer stand https://www.etsy.com/listing/1140468031/vape-cartridge-holder-spiral-vape-standga_order=most_relevant&ga_search_type=all&ga_view_type=gallery&ga_search_query=vfire&ref=sr_gallery-1-13&frs=1&pop=1&sts=1&organic_search_click=1.

VVape Cartridge holder organizer https://www.etsy.com/listing/1056851918/510-cartridge-and-battery-pen-holder-9? click_key=cba04ea9f15117ff87045b6d3f96df72664b1fb5%3A1056851918&click_sum=15fc0f1b&ref=sim_items_grid-12&pro=1&frs=1.

Stilzy Stand https://www.etsy.com/listing/1008780813/stilizy-stand?gpla=1&gao=1&.

* cited by examiner

HOLDING DEVICE FOR ARTICLES AND METHOD OF CONSTRUCTING A HOLDING DEVICE ASSEMBLY

TECHNICAL FIELD

The present disclosure relates to a novel holding device and method to construct a holding device assembly. More specifically, the present disclosure relates to an improved holding device for small articles, devices and accessories, for example, a vape pen. The hold device secures the article in an upright or vertical position when the article is 1) in use, 2) not in use or 3) in-between uses. The present holding device is adjustable to secure numerous articles or items of variable shapes and diameters. The present disclosure further relates to a method of constructing a holding device assembly incorporating holding devices with a modular component for engagement with other similar and complementary holding devices.

BACKGROUND

Various cylindrical shaped items, such as cigarettes, vape pens, dab pens, toothbrushes, artist's paint brushes, are generally simple in design and easy to use. However, when not in use, or in-between uses, these cylindrical objects are typically placed to rest on their sides, which may allow the item to potentially fall, roll, touch undesirable surfaces, clog, leak, or even break, potentially rendering the item damaged or inoperable. For example, a vape pen may undesirably leak or clog if placed on its side when not in use or in-between uses. Additionally, placing an article on its side may lead to contamination of the article itself, or even contamination of the surrounding surface. For example, a wet paintbrush with paint laid on its side may leave a mess on a surrounding surface.

Therefore, a need exists for an improved holding device useful for securing various cylindrical articles or items, as well as items having other shapes, in an upright or vertical position to avoid these potential issues and damage to the article itself and/or surrounding surfaces. Furthermore, a need exists for a holder which is configured or adjustable for receiving articles having a variety of shapes and sizes, and for securing such articles in the desired position until use.

Holders of all kinds are known for use for securing single or multiple items, for example toothbrush holders, or cell phone holders to keep these items in an upright or vertical position. However, the present disclosure includes a flexible holding device adapted for receiving items having various sizes and dimensions. The present holding device further includes a stabilizing base for maintaining the holding device and the article placed therein in a secure upright position. Moreover, the present holding device not only includes a utilitarian function to secure devices and accessories in the desired upright position but is also capable of displaying a pleasing decorative design, and/or incorporating a desired brand or identification. Additionally, the present holding device can be constructed to have a variety of shapes, designs or configurations.

Therefore, a need exists for an improved flexible holding device for holding a variety of articles in an upright or vertical position. Specifically, a need exists for an improved holding device and method of securing a variety of items or articles in an upright or vertical position, storing the articles when not in use, or in-between uses.

A need also exists for an improved holding device capable of adjusting in diameter to receive and secure articles of varying sizes and shapes.

A need further exists for an improved holding device to secure items in a desired position to prevent damage to the item and avoid possible contamination of the item and/or surrounding surfaces, among other benefits.

A need further exists for a method of constructing a holding device having a modular component, which allows for engagement of a holding device with other similar and complementary holding devices. In this manner, holding device assemblies having various configurations incorporating multiple holding devices can be created. The holding device assemblies provide a plurality of holding devices for securing multiple articles in desired positions when the articles are not in use or in-between use.

The present holding device provides numerous advantages including, but not limited to: logo and brand displaying accessory holder; vape pen holder for protection from clogs, leaks, and breakage; toothbrush or paint brush holder for protection from contacting undesirable surfaces, as well as an unlimited number of other articles that benefit from being in an upright or vertical position. The present holding device optionally provides a modular configuration for engagement with similar holding devices to create a holding device assembly. Additionally, the present holding device and holding device assembly is adaptable to secure a variety of articles having various sizes, shapes and diameters.

SUMMARY

In an embodiment of a holding device, the device comprising a base and a chamber formed within the base, the chamber positioned within an interior space of the base and configured to hold an article of varying sizes and diameters. The base provides a secure foundation for the chamber and article disposed therein. The chamber further includes a longitudinal channel or slit, which permits the chamber to expand and contract to accommodate and secure articles of varying sizes and diameters.

A method of constructing a holding device assembly is provided. The method comprises the steps of providing a plurality of holding devices having a modular base, wherein the base includes a male element and a female element, connecting the male element of at least one first holding device with a female element of at least one second holding device, and, creating the assembly of holding devices from the first holding device connected to the second holding device, wherein the assembly is capable of securing a plurality of articles in an upright position.

It is, therefore, an advantage and objective of the present disclosure to provide an improved holding device which is adaptable to receive articles having various sizes and diameters and hold these articles in a secure upright or vertical position when the articles are: 1) not in use, 2) in use, and, 3) in-between uses. The holding device is useful for preventing damage to an article and/or surrounding areas by maintaining the article in a secure and upright position.

It is another advantage and objective of the present disclosure to provide a method of constructing a holding device assembly, wherein at least one modular holding device is provided for engagement with at least one other modular holding device, wherein the engaged holding devices create a plurality of connected holding devices having various configurations and capable of holding multiple articles.

DETAILED DESCRIPTION

The present disclosure relates to embodiments of a holding device and a method to construct a holding device assembly. More specifically, the present disclosure relates to an improved holding device which is configured to secure small articles, devices, and accessories, such as a vape pen, in a secure upright or vertical position when the article is not in use. Notably, the present holding device is adjustable to accommodate articles or items having various shapes and diameters. The present disclosure further relates to a method of constructing a holding device assembly wherein modular holding devices are designed for engagement with other similar and complementary modular holding devices, creating an assembly of holding devices of various desired configurations by connecting a plurality of holding devices together.

Figure 1:
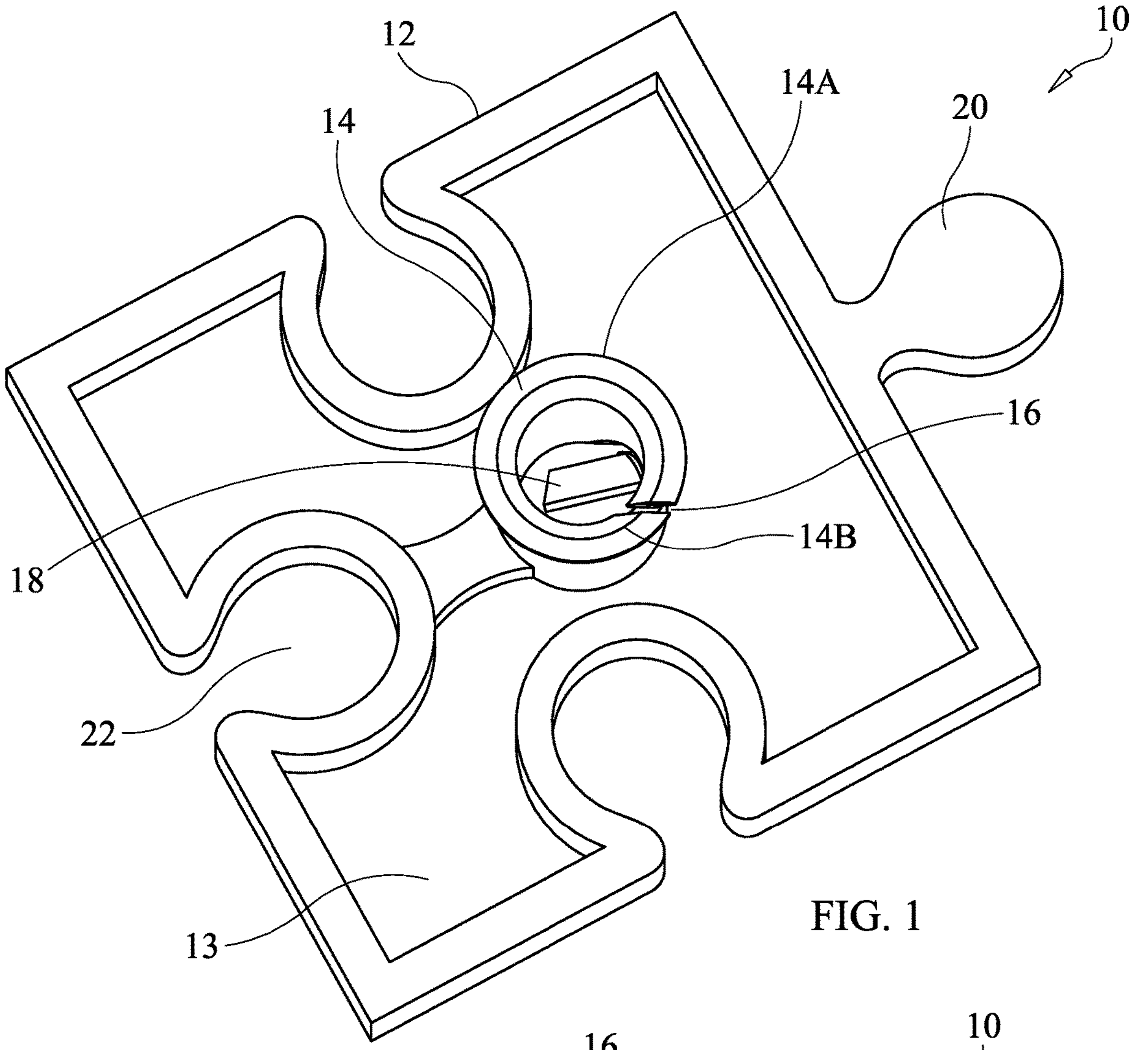
FIG. 1 illustrates an example of a holding device of the present disclosure.
Figure 2:
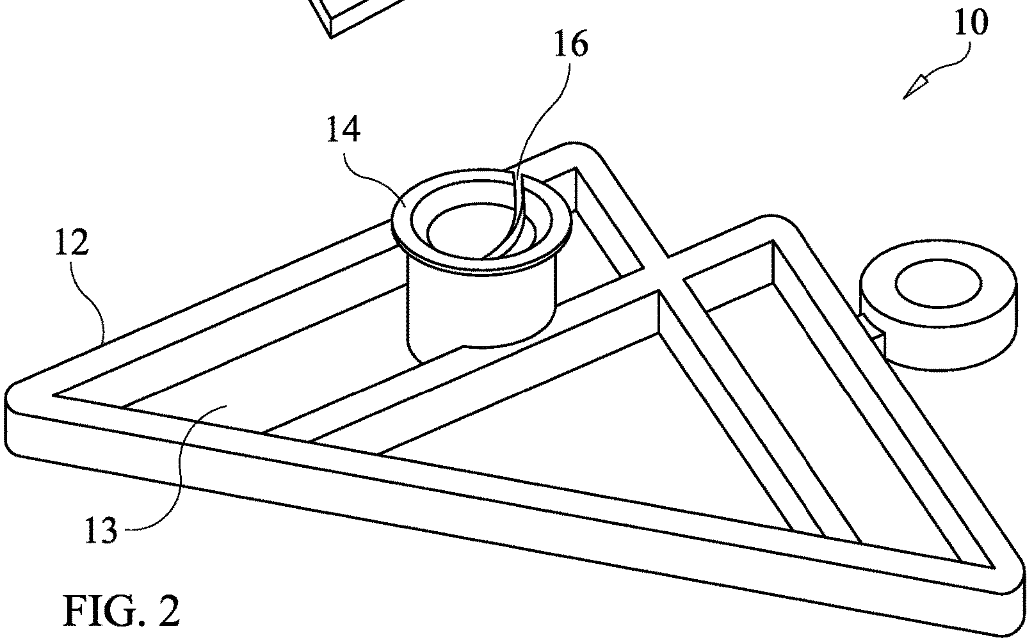
FIG. 2 illustrates another example of a holding device of the present disclosure.
Figure 3:
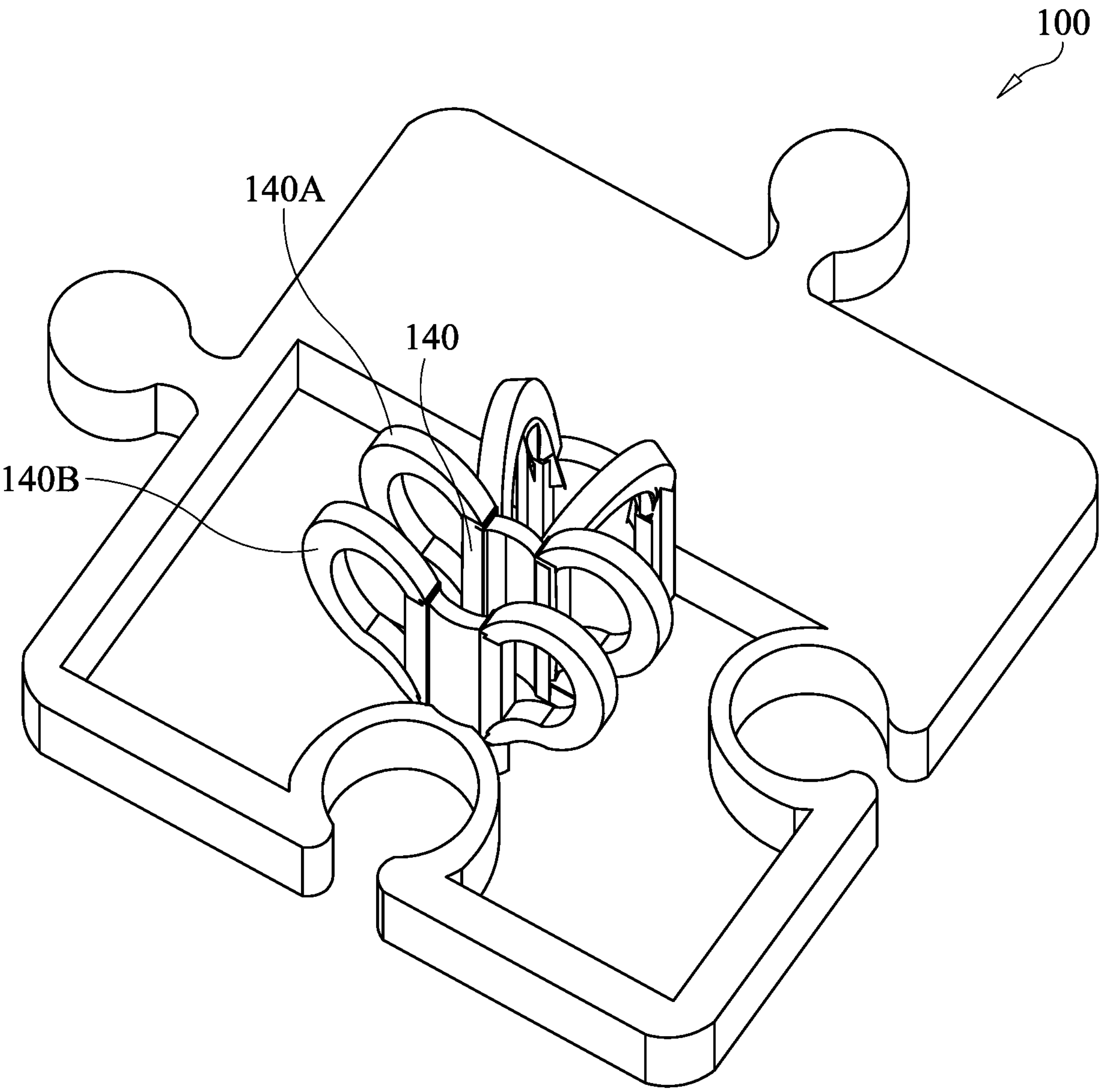
FIG. 3 illustrates another example of a holding device of the present disclosure.
Figure 4:
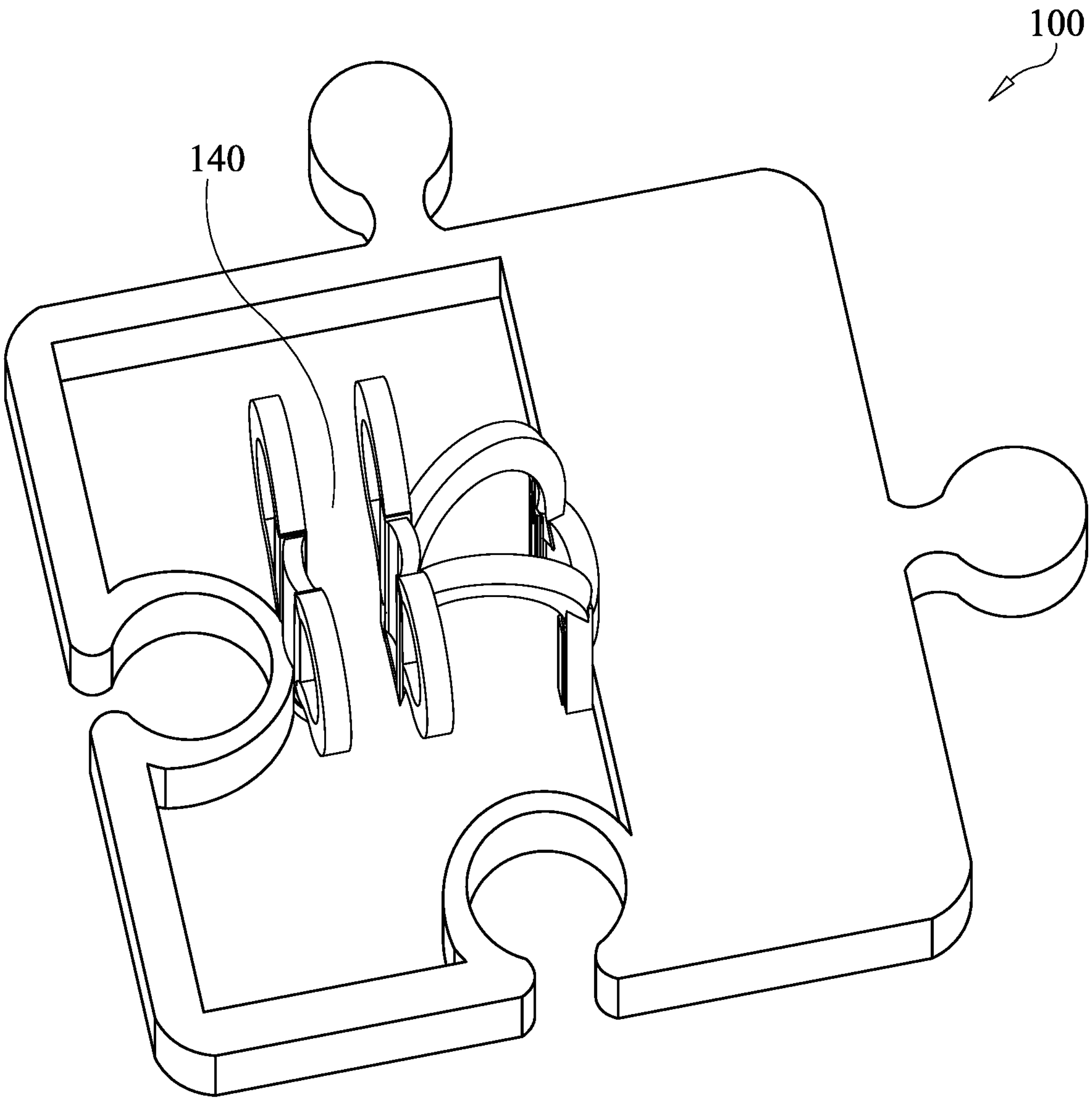
FIG. 4 illustrates a top view of the holding device shown in FIG. 3.
Figure 5:
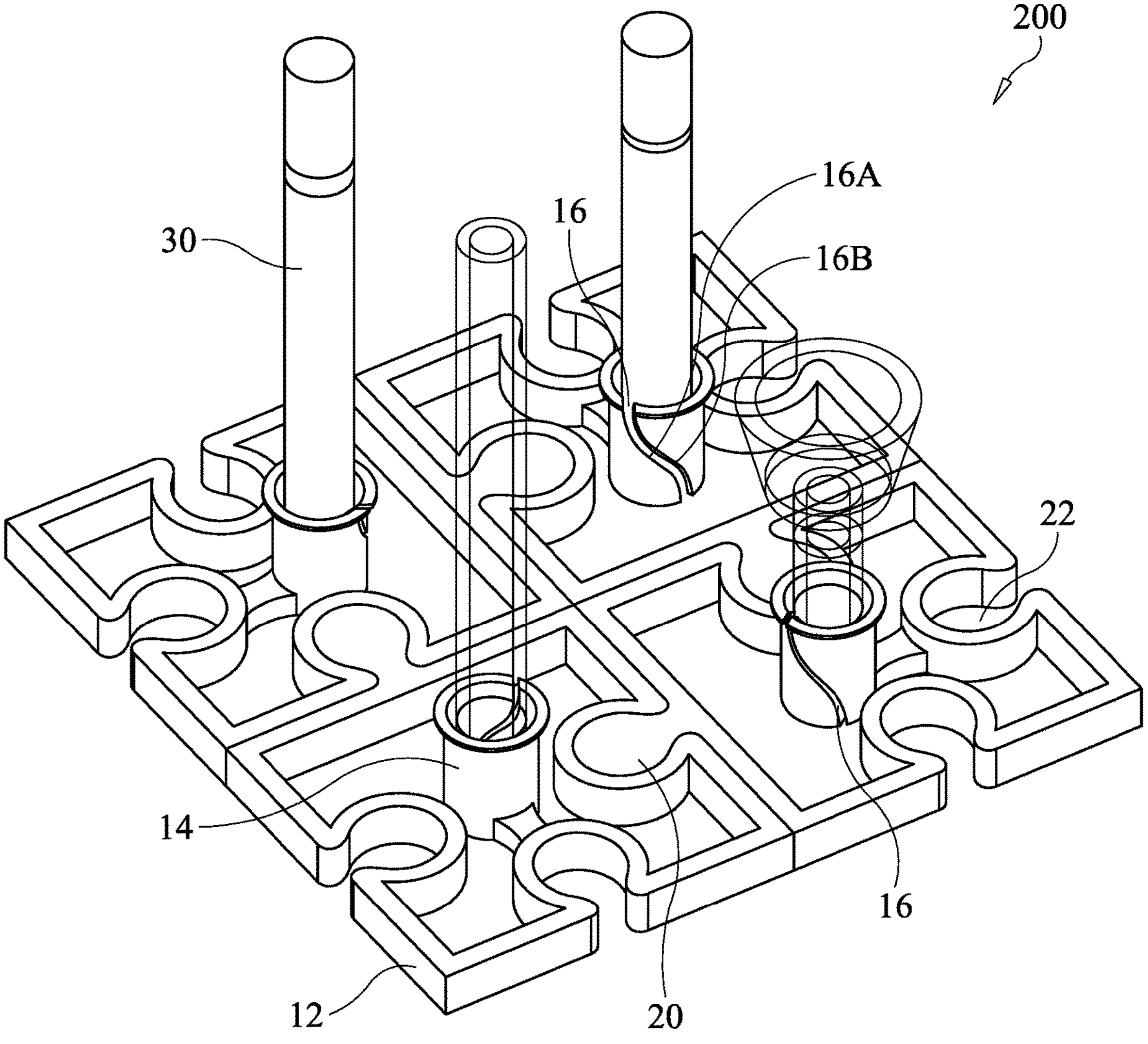
FIG. 5 illustrates an example of a holding device assembly showing an arrangement of a plurality of holding devices of the present disclosure in use with articles.
Figure 6:
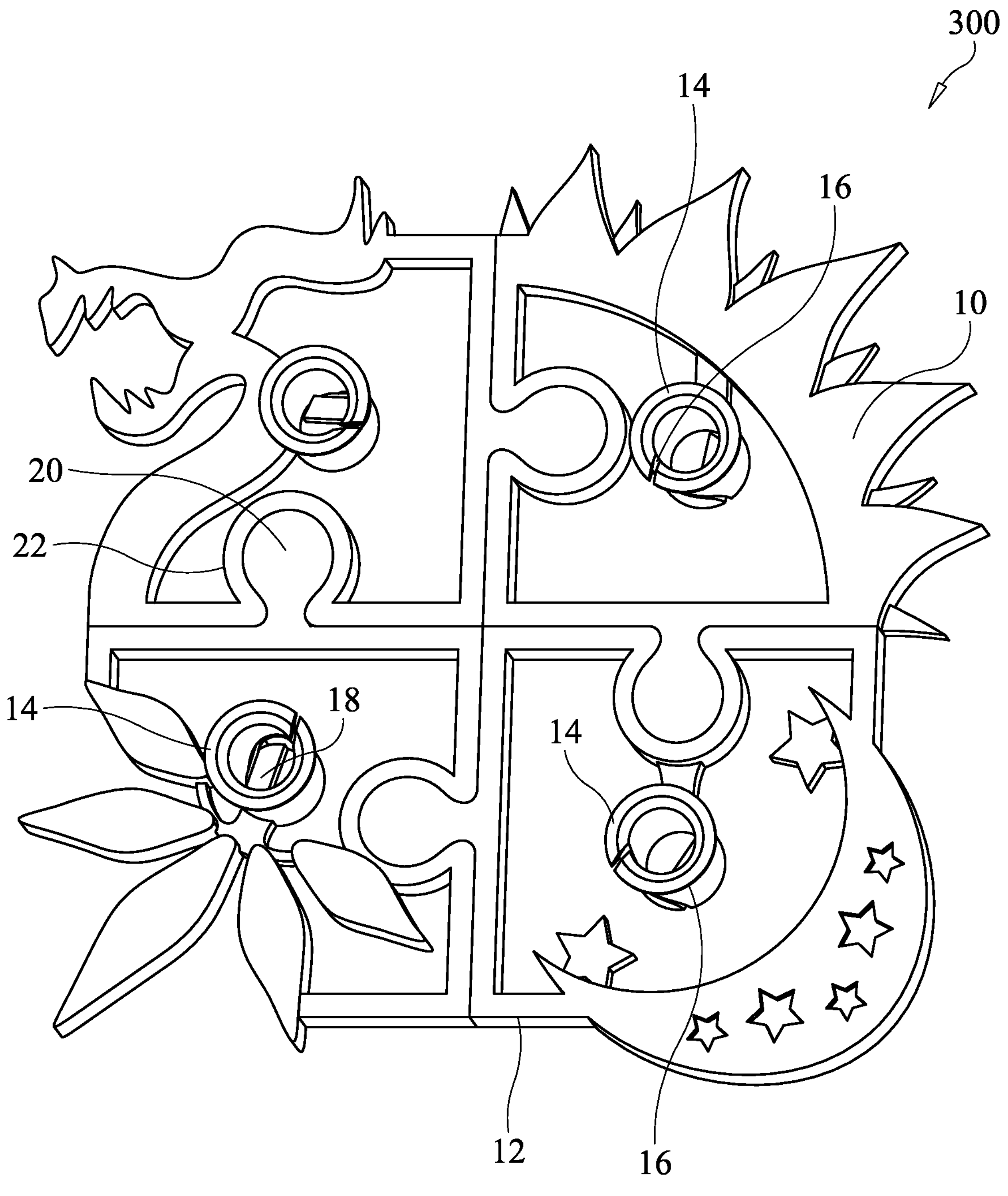
FIG. 6 illustrates an example of a holding device assembly showing an arrangement of a plurality of holding devices of the present disclosure having various design configurations.

FIG. 1 illustrates an embodiment of a holding device according to the present disclosure. FIG. 2 illustrates another embodiment of the holding device of the present disclosure. FIGS. 3 and 4 illustrate yet another embodiment of a holding device having an open chamber configuration. FIGS. 5 and 6 illustrate embodiments of assemblies of holding devices according to the present disclosure.

As shown in FIG. 1, the holding device 10 includes a base 12, with a chamber 14 disposed within an interior space 13 of the base. As shown in the figures, the base 12 can have a variety of shapes from a square shape (FIG. 1) to novelty shapes (FIGS. 5 and 6). The holding device 10 can be constructed from either a flexible or a rigid material, such as rubber or plastic, using known techniques, including 3D printing or injection molding. These techniques provide the ability to create a variety of novel shapes for the base 12. Additionally, the base 12 can be used as a platform for displaying logos or brands. For example, a logo can be imprinted into the base, applied as an adhesive label, or attached in any other suitable manner.

The chamber 14 can be located anywhere within the interior space 13 of the base but is ideally positioned such that the base provides a stable foundation for the holding device when an article, such as a vape pen 30 is placed within the chamber. In one embodiment, the chamber 14 is centered within the interior 13 of the base 12 (FIGS. 1 and 2). In this arrangement, the chamber 14 is surrounded by the base 12, which provides a stable foundation for placing articles within the chamber and holding the articles in the upright position. It should be noted that although a vape pen 30 is described and shown as an example of an article, the present holding device 10 is useful for holding an unlimited variety of articles in an upright position and should not be limited to the article shown. The chamber 14 is ideally constructed from any suitable flexible material, such as a rubber or plastic.

In one embodiment, the chamber 14 has a generally cylindrical or tubular shape with an open top and an open bottom and is configured for receiving a cylindrical article, such as a vape pen 30 (FIGS. 1 and 5). In another embodiment of a holding device 100, the chamber 140 is shown as an open chamber formed between two opposing side walls 140A, 140B (FIGS. 3 and 4). In this embodiment the open chamber 140 is ideal for securing articles having non-cylindrical shapes. For example, a cell phone or similarly shaped article (not shown) would sit within the open chamber 140 and secured by the two opposing side walls 140A, 104B of the holding device embodiment in FIGS. 3 and 4. Therefore, it should be understood the chamber 14, 140 can have any suitable geometric shape.

When an article, such as a vape pen 30 or the end of a handle of a paint brush is placed within the chamber 14, the configuration of the chamber combined with the flexible construction of the chamber, secures the article an upright or vertical position. Additionally, the chamber 14 holds the article securely such that when the article is picked up by the user, the holding device 10 remains attached to the bottom of the article. For example, if a vape pen 30 is held within the chamber 14 and the user picks up the vape pen for use, the holding device 10 remains attached to the bottom of the vape pen and is simultaneously picked up by the user. Because the article remains within the holder device 10, it provides stability for replacing the article onto a surface, and ensures the article stays in the upright position between transitions of use and non-use.

As shown FIGS. 1 and 5, the chamber 14 is configured to receive and secure articles of various sizes, including articles 30 having diameters of various sizes. The adaptability of the chamber 14 results from the flexible construction of the chamber and the inclusion of a channel or slit 16 within the body of the chamber. The slit 16 extends vertically along a length of the chamber, from a top outer edge 14*a* of the chamber to a bottom edge 14*b* of the chamber. Additionally, the base 12 surrounding the chamber 14 also contributes to the stability of the overall holding device as the base remains stable while the chamber expands to receive an article.

In one embodiment of a holding device 200, the channel or slit 16 extends in a slight angular direction or has a curving shape or configuration along the length of the chamber 14 (FIG. The curved shape of the slit 16 provides a wider opening than a straight vertical slit, and because opposing edges 16A, 16B of the slit effectively wrap around the article, the article is provided with a more secure, upright position until removed. An advantage of the slit 16 within the chamber 14 is that it permits the diameter of the chamber to change, specifically to widen from a first position to a second position to securely accommodate articles of varying diameters when the article is placed within the chamber. When the article 30 is removed from the chamber 14 the slit 16 returns to its slightly closed first position (FIG. 6).

The flexible construction of the chamber 14 means that when the article 30 is placed within the chamber, the slit 16 opens gradually, widening the inner diameter of the chamber, as the article is lowered into the chamber. In this manner, the slit 16 opens just to the extent necessary to receive the article, without losing the ability of the chamber to hold the article in the upright position. As the article 30 is lifted out of or removed from the chamber 14, the slit 16 gradually closes, thereby restoring the chamber 14 to its original diameter. The combination of the flexibility of chamber 14 combined with the presence of the slit 16 within the chamber, provides the advantage of the chamber to accommodate articles of various sizes and shapes securely within the holding device 10.

As shown in FIG. 1, the chamber 14 further includes a bottom arm 18. The bottom arm 18 extends horizontally from the bottom edge 14B of the chamber 14 near the slit 16, extending inward toward the interior of the chamber. The bottom arm 18 provides a surface for resting an end of the article placed within the chamber 14 and prevents the article from falling through beyond the bottom of the chamber and base 12. The position and design of the bottom arm 18 however, does not inhibit the ability of the chamber 14 to expand for receiving an article, but provides additional structural stability to the chamber upon expansion.

FIGS. 5 and 6 illustrate another embodiment of the present holding device, specifically an assembly 100 or arrangement created using a plurality of individual holding devices 10 connected together. FIG. 5 illustrates an embodiment of a holding device assembly 200 in use with various articles, including a vape pen 30. FIG. 6 illustrates an embodiment of a holding device assembly 300 created from a variety of novel shapes of individual hold devices. In FIG. 5 the opening of the slot 16 in the second position for receiving an article is demonstrated, while in FIG. 6, the closing of the slot into the first position after an article is removed, is demonstrated.

In the holding device assemblies 200, 300, the base 14 of the individual holding device 10 includes a modular element, either a male element 20 and/or a complimentary a female element 22. By joining the male element 20 to the female element 22 of individual holding devices 10, any number of individual holding devices can be joined together and arranged to create unique configurations or assemblies 200, 300. Additionally, each hold device includes a chamber 14 for receiving an article, and the resulting assemblies are useful for holding a plurality of articles.

It should also be understood that the present holding devices 10 can be constructed having any variety of novel shapes to the base 12. For example, as shown in FIG. 6, in the holding device assembly 300, the base 12 can be created in the shape of a dragon, a plant, moon and stars, flowers, waves, boats, etc. The use of 3D printing or injection molding to construct the present holding devices 10 provides unlimited possibilities for designs. Additionally, the modular configuration of the base 12 means that the various shaped bases can be joined together as described above, to create a plurality of holding device assemblies 200, 300 limited only by imagination. The base 12 of the holding device 10 can also be imprinted with any designs, textures, logos or brands for advertising or other promotional purposes.

I claim:

1. A holding device for securing an article, the holding device comprising:

a base;

a chamber positioned within an interior space of the base, the chamber having a tubular shape extending vertically above a plane of the base, the chamber including an open top and an open bottom, wherein the chamber is configured for receiving the article and holding the article in an upright position.

2. The holding device of claim 1, wherein the chamber is centrally positioned within the interior space of the base.

3. The holding device of claim 1, wherein the chamber includes a slit extending along a length of the chamber from the top of the chamber to the bottom of the chamber.

4. The holding device of claim 3, wherein the slit has a curved configuration.

5. The holding device of claim 4, wherein the slit is capable of moving between a first closed position and a second open position.

6. The holding device of claim 5, wherein the slit moves between the first closed position and the second open position when article having a diameter is placed within the chamber.

7. The holding device of claim 6, wherein the second open position of the slit increases a diameter of the chamber.

8. The holding device of claim 7, wherein the second open position secures the article in upright position within the chamber.

9. A holding device for receiving and holding an article, the holding device comprising:

a base having a modular element;

a tubular chamber extending vertically above a plane of the base and positioned within an interior space of the base;

a channel extending along a length of the chamber from a top of the chamber to a bottom of the chamber;

wherein the channel opens between a first position and a second position to extend a diameter of the chamber to receive an article and secure the article in an upright position within an interior of the chamber.

10. The holding device of claim 9, wherein the modular element is a male component.

11. The holding device of claim 9, wherein the modular element is a female component.

12. The holding device of claim 11, wherein the female component of a first base is configured for engagement with the male component of a second base to create a holding device assembly.

13. The holding device of claim 9, wherein the diameter of the chamber changes to accommodate articles having a variable diameter.

* * * * *